United States Patent
Sokolean

[11] Patent Number: 6,073,407
[45] Date of Patent: Jun. 13, 2000

[54] HEATING AND COOLING CEILING

[75] Inventor: Helmuth Sokolean, Uerikon, Switzerland

[73] Assignee: Barcol-Air AG, Stäfa, Switzerland

[21] Appl. No.: 08/991,619

[22] Filed: Dec. 16, 1997

[30] Foreign Application Priority Data

Dec. 20, 1996 [CH] Switzerland ............... 3155/96

[51] Int. Cl.[7] ............... E04B 9/02; F24D 3/14
[52] U.S. Cl. ............... 52/302.1; 52/220.6; 52/506.01; 52/506.08; 165/49; 165/56; 237/69
[58] Field of Search ............... 52/302.1, 506.01, 52/506.02, 506.03, 506.04, 506.08, 220.6, 220.7, 38, 39, 86; 165/49, 56, 171; 237/69; 29/890.038

[56] References Cited

U.S. PATENT DOCUMENTS

| | | | |
|---|---|---|---|
| 2,823,016 | 2/1958 | Greer, Jr. | 165/49 |
| 2,823,522 | 2/1958 | Collins | 165/171 |
| 3,144,079 | 8/1964 | Mack | 165/49 X |
| 3,372,740 | 3/1968 | Kastovich et al. | 165/171 |
| 3,379,241 | 4/1968 | Gau | 165/171 X |
| 4,338,995 | 7/1982 | Shelley | 165/171 X |
| 4,635,710 | 1/1987 | Shelly | 165/49 |
| 4,646,500 | 3/1987 | Smith | 52/506.01 X |
| 4,766,951 | 8/1988 | Bergh | 165/171 X |
| 4,833,839 | 5/1989 | Kurose | 52/220.6 X |
| 5,454,428 | 10/1995 | Pickard et al. | 165/49 |

FOREIGN PATENT DOCUMENTS

| | | |
|---|---|---|
| 2 712 380 | 5/1995 | France . |
| 94 01 030 U | 6/1994 | Germany . |
| 2 152 970 | 8/1985 | United Kingdom . |

*Primary Examiner*—Carl D. Friedman
*Assistant Examiner*—Winnie Yip
*Attorney, Agent, or Firm*—Finnegan, Henderson, Farabow, Garrett & Dunner, L.L.P.

[57] ABSTRACT

A plurality of air-conditioning panels (1), which are arranged one beside the other and parallel to one another and have a width of from 100 to 150 mm, each have, on the top side, a central longitudinal groove (4) for receiving a pipe (5). In order to form a stable, slow flow, which does not produce any undesired bursts of cold air, of the air cooled on the air-conditioning panels (1), the latter are bounded on both sides by shoulders (6) which bend downwards to the vertical and have a radius of curvature of not more than 20 mm. The borders of adjacent air-conditioning panels are spaced apart from one another and form between them air gaps having a width of from 10 to 20 mm.

16 Claims, 1 Drawing Sheet

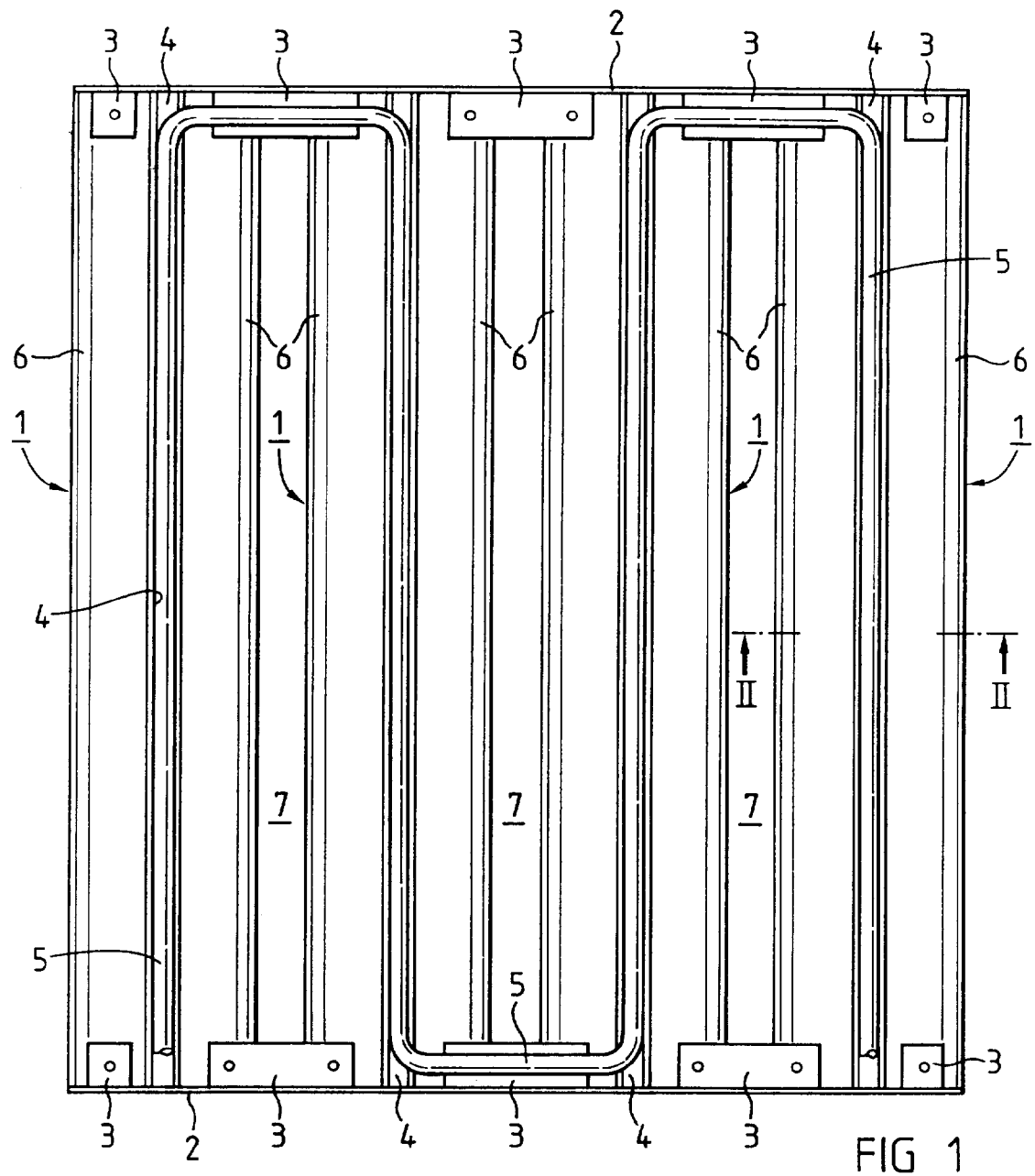
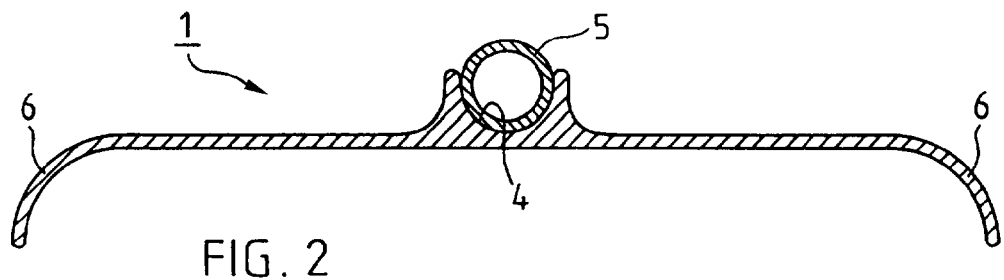

HEATING AND COOLING CEILING

The invention relates to a ceiling element for a heating and cooling ceiling.

Various configurations of ceiling elements which can be used for heating ceilings and cooling ceilings and for ceilings which are intended both for heating and cooling purposes are known. Some of these configurations are described in H. Sokolean: "Kühldeckentechnologie zur Erreichung des bestmöglichen Raumkomforts" [cooling-ceiling technology for achieving the best possible interior conditions], Architektur und Technik 8/92, pp.49–53, B+L Verlags AG, Schlieren (Switzerland).

One of the basic problems with the design of such ceiling elements resides in the fact that, on the one hand, it is desired to achieve the highest possible cooling capacity even with comparatively small elements but, on the other hand, the comfort in the air-conditioned room must not be disrupted. Heating and cooling ceilings provide inherently favourable preconditions for this since a substantial proportion of the heat exchange between the ceiling elements and the room take place via radiation, which does not result in any direct adverse effect to comfort. If, however, high cooling capacities are to be achieved, then the ceiling elements have to be designed and arranged such that heat exchange can also take place by convection.

However, in the case of conventional ceiling elements, convective exchange puts the comfort in the air-conditioned room in question since accumulations of cold air form easily in the immediate vicinity of the ceiling elements and are then discharged in irregular bursts, this resulting in comparatively strong flows which, at the same time, cause temperature fluctuations. However, the flow rate not exceeding certain limit values, or only exceeding them during short periods of time, is known to be a decisive factor for room comfort. These findings are reflected in corresponding standards, too.

It has been found that the inventive configuration of ceiling elements promotes the formation of stable flow patterns. The convective flow emerging from the immediate vicinity of the ceiling element only fluctuates by a small amount over time. It is distributed spatially directly beneath the ceiling element and stabilizes in the process. There are no undesired bursts of cold air and the flow rates remain very low, even with high cooling capacity, in particular they lie beneath the limit values which the usual standards permit.

This makes it possible to achieve high cooling capacities even with small, spaced-apart ceiling elements, without high flow rates taking place and the comfort in the air-conditioned room coming into question.

The invention is explained in more detail hereinbelow with reference to figures, which illustrate merely an exemplary embodiment and in which:

FIG. 1 shows a plan view of a ceiling element according to the invention, and

FIG. 2 shows a cross-section, corresponding to II—II in FIG. 1, through part of the ceiling element according to the invention.

The ceiling element according to the invention comprises a plurality of parallel air-conditioning panels 1 which are spaced apart one beside the other, are of the same type and are connected by webs 2 which run transversely at the ends of the air-conditioning panels 1. The webs 2 bear inwardly projecting flanges 3 which are riveted to the air-conditioning panels 1.

Each air-conditioning panel 1 is extruded from aluminium and has a constant cross-section over its entire length. On the top side, it bears in the centre a longitudinal groove 4 which is bounded by two parallel webs, has a round cross-section and serves as a guide for a pipe 5 which is snapped into said guide, consists preferably of copper and is intended for the transportation of a heat transfer medium, e.g. brine. Otherwise, the air-conditioning panel 1 is designed as a rectangular panel which is comparatively thin, preferably having a thickness of approximately 1.5 mm, and whose top side merges, in the border regions, into round shoulders 6 which bend downwards. The cross-section of these shoulders follows a quarter-circle having a radius of approximately 15 mm, i.e. they are bent to such an extent that, directly at the border of the air-conditioning panel 1, they are oriented vertically downwards. The outsides of the webs which bound the longitudinal groove 4 likewise merge smoothly, via a concave section, into the adjoining region of the top side of the air-conditioning panel 1. The width of the air-conditioning panel 1 is approximately 120 mm.

The pipe 5 is routed through the longitudinal grooves 4 of all the air-conditioning panels 1 in meandering fashion. At the end of an air-conditioning panel 1, it is guided upwards out of the longitudinal groove 4 in each case, bent at right angles and runs transversely up to the centre of the adjacent air-conditioning panel 1, where it is bent at right angles again and is routed obliquely downwards into the longitudinal groove 4 of said adjacent panel. The free ends of the pipe 5, of course, are likewise guided out of the longitudinal grooves 4 and remain free for the connection of a feed line and a discharge line. The entire ceiling element is painted, anodized or powder-coated.

The distance between the side borders of two adjacent air-conditioning panels 1 is approximately 17 mm. Said side borders thus form air gaps 7 which have a width of 17 mm and through which the air cooled on the top sides of the air-conditioning panels can flow downwards. The convexly rounded design of the border regions of the top sides causes a stable, slow flow to form there, said flow quickly dispersing over a small area beneath the ceiling element. The formation of accumulations of cold air which are discharged in bursts and penetrate in a comparatively concentrated manner into lower levels of the air-conditioned room is thus prevented.

Of course, it is not only when the design of the ceiling element follows the outlined exemplary embodiment precisely that this effect is achieved. It is possible to make various changes without having any great adverse effect. Thus, for example, the top side of the air-conditioning panel may be arched convexly over its entire width. The decisive factor is to design the border regions as shoulders which bend downwards, i.e. as regions whose convex curvature in the direction transverse to the longitudinal direction is greater than that of the region which adjoins the centre of the air-conditioning panel. The shoulders are preferably bent to such an extent that, directly at the border, they are oriented at least approximately vertically downwards. Preferably, the radius of curvature in the region of the shoulders should not be greater than 20 mm. It need not be constant.

It is also possible for the width of the air-conditioning panels to differ to a more or less pronounced extent from the specified value. Widths between 100 mm and 150 mm are favourable. The same applies for the width of the air gaps formed between the borders of adjacent panels, this width preferably being between 10 mm and 20 mm. The width of the air gaps should preferably be between 10% and 20% of the width of the air-conditioning panels. The air-conditioning panels are preferably arranged horizontally and on the same level, but other arrangements—e.g. alternately on slightly different levels and possibly inclined slightly around the respective longitudinal axis—are not ruled out. Finally, the air-conditioning panels may also be perforated and provided with an acoustic non-woven on the top side.

There are various possibilities for arranging ceiling elements according to the invention in a room. They are preferably suspended some way beneath a concrete ceiling, with the result that they exchange heat by radiation with the room beneath them, and the objects in said room, both directly and via the ceiling and moreover, if required, provide strong additional cooling by convection. In this case, it is possible to dispense with a false ceiling, or a perforated false ceiling, e.g. with a proportion of perforations of between 16 and 60%, can be drawn in beneath the ceiling elements. In addition to this, it is also possible for ceiling elements according to the invention to be suspended beneath a false ceiling of the above described design, or of some other design, or to be inserted into the false ceiling such that each ceiling element replaces one or more elements of said false ceiling.

What is claimed is:

1. A heating or cooling ceiling, comprising:
   at least one elongate horizontal panel mounted such that a top side of the at least one panel faces an upward direction, and having a guide through which a heating or cooling medium flows,
   wherein the top side of the panel is bordered at lateral most edges by round shoulders that curve downwards from the horizontal panel, ending substantially free from a connection to surrounding parts of the ceiling, to provide stable air flow patterns around the shoulders between areas above and below the horizontal panel.

2. The heating or cooling ceiling according to claim 1, wherein the round shoulders curve down to at least an approximately vertical orientation.

3. The heating or cooling ceiling according to claim 1, wherein in a direction transverse to a longitudinal direction, the round shoulders have a radius of curvature of not more than 20 mm.

4. The heating or cooling ceiling according to claim 1, wherein between the round shoulders the top side of the panel is essentially planar.

5. The heating or cooling ceiling according to claim 1, wherein the guide is arranged on the top side of the panel.

6. The heating or cooling ceiling according to claim 1, wherein the panel has a width between 100 mm and 150 mm.

7. The heating or cooling ceiling according to claim 1, wherein the at least one elongate horizontal panel is mounted to a mounting structure such that the top side of the at least one elongate horizontal panel faces an upward direction toward the mounting structure.

8. The heating or cooling ceiling according to claim 1, wherein the at least one panel is mounted above a space such that the round shoulders of the panel curve downwards toward the space.

9. A heating or cooling ceiling comprising
   a plurality of elongate horizontal panels being fixed in a parallel orientation spaced apart from one another by a lateral distance to provide stable air flow patterns between each of the plurality of parallel panels, each of said plurality of panels mounted such that a top side of each panel faces an upward direction and having a guide through which a heating or cooling medium flows,
   wherein the top side of each of the panels is bordered by round shoulders that curve downwards from the respective panel and are convex as seen from above to provide stable air flow patterns around the shoulders between areas above and below the respective panel.

10. The heating or cooling ceiling according to claim 9, wherein each of the panels are arranged beside each other about a parallel orientation.

11. The heating or cooling ceiling according to claim 9, wherein the lateral distance between adjacent panels is at least 10 mm.

12. The heating or cooling ceiling according to claim 9, wherein the lateral distance between adjacent panels is not more than 20 mm.

13. The heating or cooling ceiling according to claim 9, wherein lateral edges of each of the panels remain free to provide said stable air flow patterns without interference from a connection to surrounding parts of the ceiling.

14. The heating or cooling ceiling according to claim 9, wherein the guide is arranged on the top side of at least one of the panels.

15. The heating or cooling ceiling according to claim 9, wherein each of the panels is mounted to a mounting structure such that the top side of each panel faces an upward direction toward the mounting structure.

16. The heating or cooling ceiling according to claim 9, wherein each of the panels is mounted above a space such that the round shoulders of each panel curve downwards toward the space.

* * * * *